No. 897,054. PATENTED AUG. 25, 1908.
A. H. BOSWORTH.
HAY LOADER.
APPLICATION FILED APR. 12, 1907.
3 SHEETS—SHEET 1.

WITNESSES
INVENTOR
Albert H. Bosworth
BY
ATTORNEYS

No. 897,054.

A. H. BOSWORTH.
HAY LOADER.
APPLICATION FILED APR. 12, 1907.

PATENTED AUG. 25, 1908.

3 SHEETS—SHEET 2.

WITNESSES

INVENTOR
Albert H. Bosworth
BY
ATTORNEYS

No. 897,054. PATENTED AUG. 25, 1908.
A. H. BOSWORTH.
HAY LOADER.
APPLICATION FILED APR. 12, 1907.
3 SHEETS—SHEET 3.
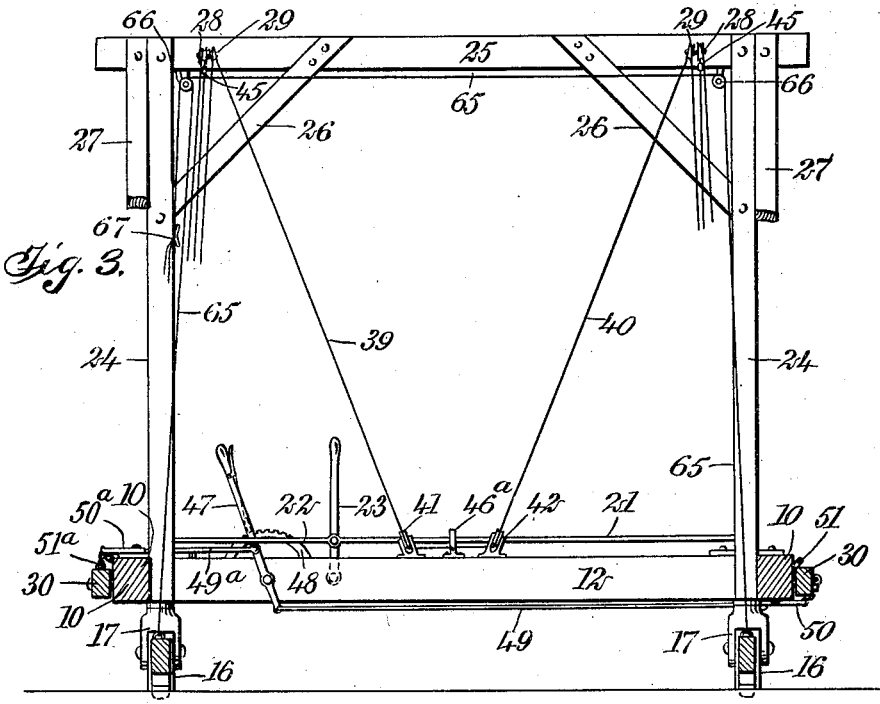
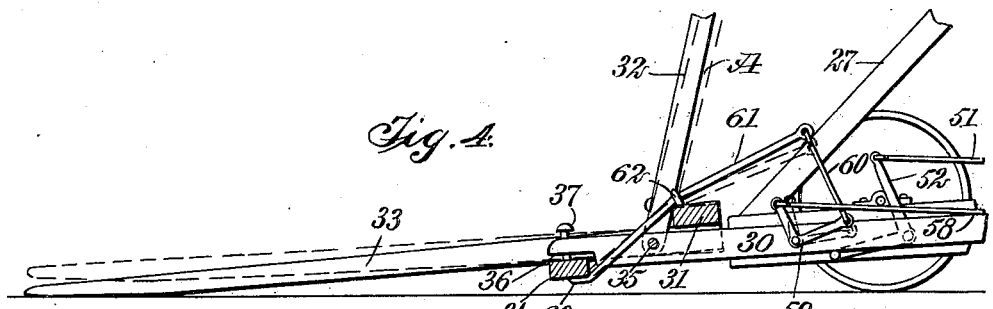
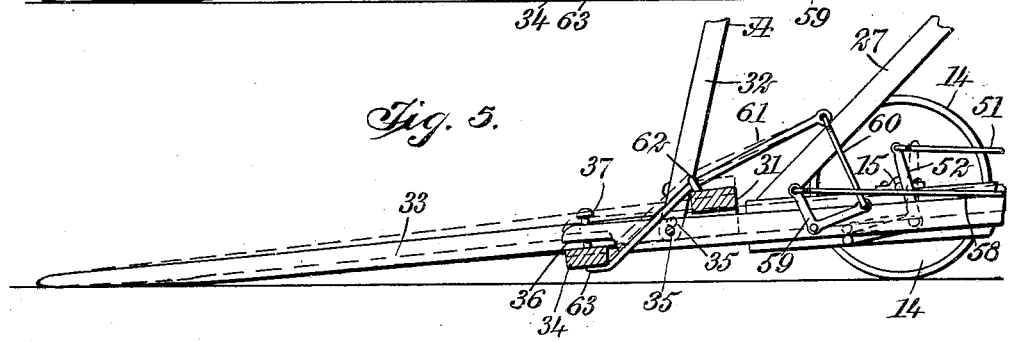
WITNESSES
INVENTOR
Albert H. Bosworth
BY
ATTORNEYS

UNITED STATES PATENT OFFICE.

ALBERT HENRY BOSWORTH, OF FALL RIVER MILLS, CALIFORNIA.

HAY-LOADER.

No. 897,054.  Specification of Letters Patent.  Patented Aug. 25, 1908.

Application filed April 12, 1907. Serial No. 367,845.

*To all whom it may concern:*

Be it known that I, ALBERT HENRY BOSWORTH, a citizen of the United States, and a resident of Fall River Mills, in the county of Shasta and State of California, have invented a new and useful Improvement in Hay-Loaders, of which the following is a full, clear, and exact description.

My invention relates to that class of farming implements wherein the hay is elevated by the rake that gathers it and is also deposited upon a wagon by means of the same rake.

The purpose of the invention is to simplify and economize in the construction of such implements and to provide means under the complete control of the operator for independently elevating the head of the rake to depress the teeth, and means for elevating the teeth and the head.

A further purpose of the invention is to provide means whereby when the rake is elevated and relieved from the tension of its hoisting cables, said rake will be automatically started upon its return movement, and wherein the steering of the device can be controlled by the movement of a single lever.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1:
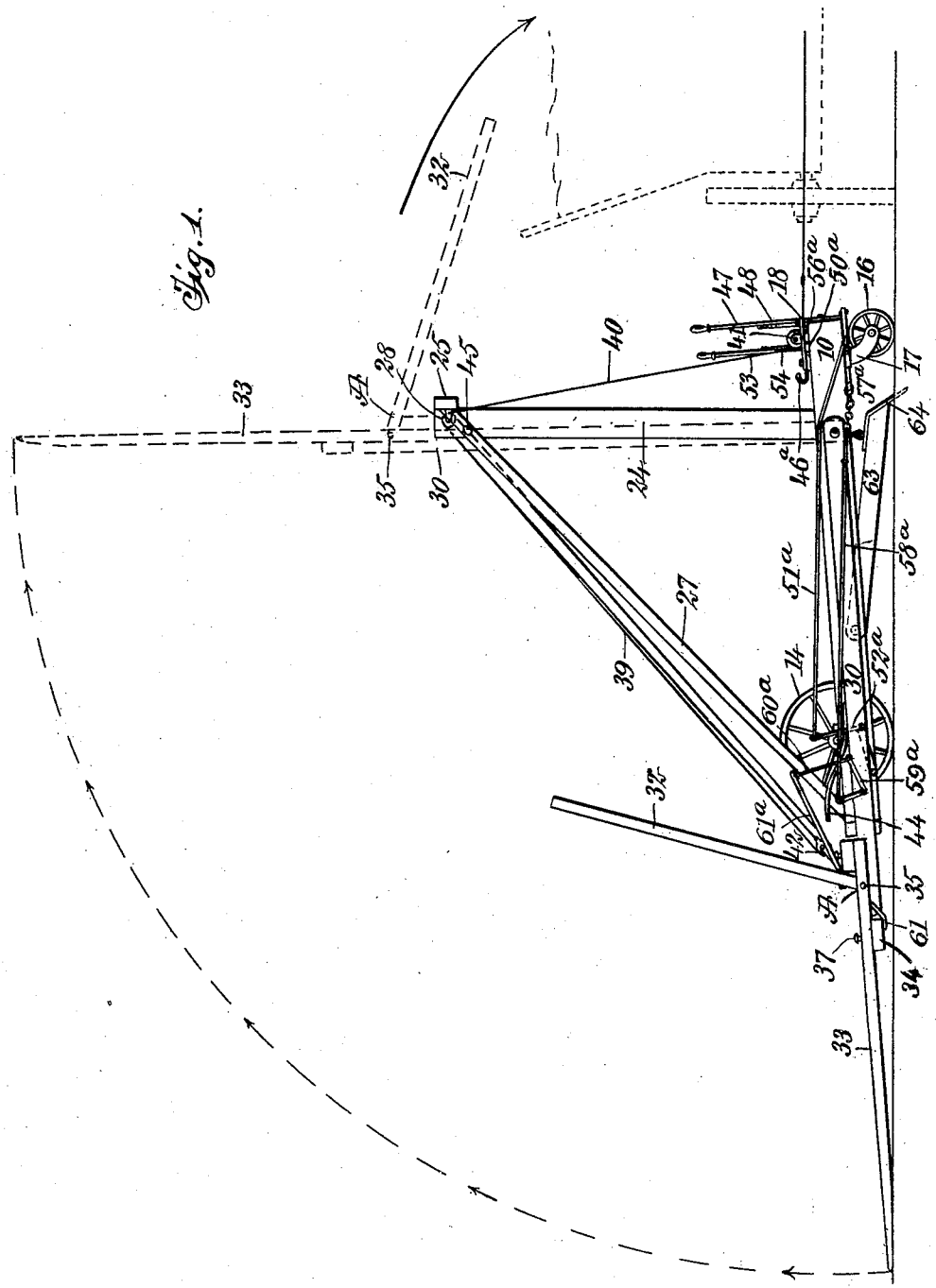
Figure 2:
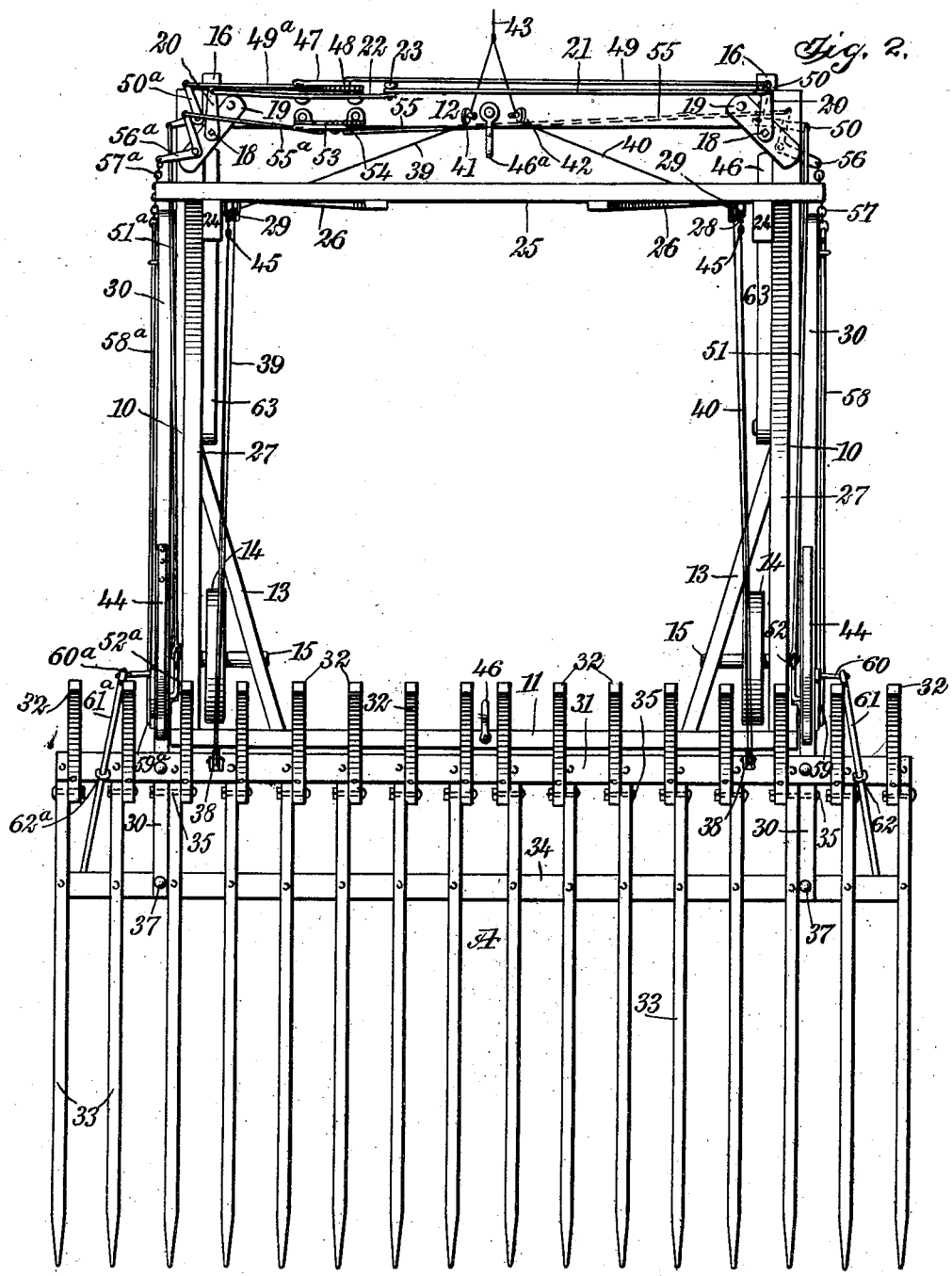

Figure 1 is a side elevation of the implement or device showing the rake in receiving position in full lines and in delivery position in dotted lines; Fig. 2 is a plan view of the implement or device; Fig. 3 is a transverse section taken forward of the rear standards and looking in direction of the rear; Fig. 4 is a side elevation of the forward portion of the frame and a section through a projecting end portion of the rake, the teeth being shown in positive lines in engagement with the ground at their points, and in dotted lines the teeth are illustrated as elevated and the head rocked backward; and Fig. 5 is a similar view to that shown in Fig. 4, illustrating the same position of the parts in positive lines but showing the head of the rake elevated and thrown slightly forward in dotted lines to further depress the points of the teeth.

The frame is of skeleton construction and consists of side beams 10, a forward cross bar 11 and a rear bar 12. The side beams and the rear beam are braced by bars 13 and between the brace bars 13 and the side beams 10, supporting wheels 14 are located, mounted to revolve upon axles 15 suitably mounted in the said brace bars 13, and side beams 10, as is best shown in Fig. 2. The rear portion of the frame is supported by caster wheels 16 that are mounted in suitable bearings 17, and the shanks 18 of the said bearings extend upward through and beyond the rear beam 12 and are provided with attached crank arms 20. These arms 20 are connected pivotally with links 21 and 22 and the said links 21 and 22 are connected in their turn with a lever 23 that is pivoted to the rear beam 12, as is best shown in Fig. 3, so that by moving the lever 23 in one or the other direction the caster wheels may be turned so as to direct the machine as it is drawn forward or rearward in transportation from place to place.

Standards 24 extend up from the rear portions of the side beams 10 and these standards support at their upper ends a cross bar 25, the ends whereof are carried beyond the said standards. Brace bars 26 extend from the upper cross bar or member 25 to the standards 24 to support the structure at such point, and the said upper structure is further supported by means of brace beams 27 that extend from the outer ends of the upper cross bar or beam 25 to an engagement with the side beams 10 at the forward end portions thereof. A pulley block 28 is supported from the inner face of the upper cross bar 25 adjacent to each of its ends, and at the inner side of each pulley block 28, a guide roller or pulley 29 is also secured to the inner face of the said upper cross bar 25. An arm 30 is located at the outer face of each side beam 10 of the main frame of the machine, and these arms 30 are pivotally connected with the said side beams 10 adjacent to the rear ends of the beams. The arms 30 extend beyond the forward end of the main frame, as is clearly shown in Fig. 2, for a purpose to be hereinafter mentioned.

The rake A consists of a rear bar 31 that extends beyond the outer side faces of the side beams 10 of the frame and likewise beyond the outer side faces of the arms 30, as is clearly shown in Fig. 2. A series of slats 32 is secured to the said rear cross bar 31 of the rake and the said slats are given an upward and a rearward inclination when the rake is in receiving position or in the position shown in Fig. 2. A series of rake teeth 33 is likewise attached at their rear ends to the under face of the cross bar 31 of the said rake, the slats 32 heretofore mentioned being secured in any approved manner to the forward face or surface of the same cross bar and the said slats 32 at their lower ends enter the space between the rear end portions of the teeth 33. The rake teeth 33 are connected one with another by a cross bar 34 that is located but a short distance in advance of the rear cross bar 31 heretofore referred to.

Bolts 35 are passed through the lower end portions of all of the slats 32 and likewise through all of the teeth 33 at a point adjacent to which the said slats are located, in order to fasten the slats and teeth firmly together, and two of these bolts are also passed through the outer or forward end portions of the arms 30, as shown in Fig. 2, to constitute pivots for the rake. The outer end portions of the aforesaid arms 30 are recessed on their under faces, the recesses being designated as 36, and the said recesses 36 are so made that they neatly receive the cross bar 34 of the teeth 33 bearing upon the upper face of said cross bar. The cross bar 34 just referred to is provided with pins 37 that loosely pass through the forward end portions of the arms 30, as is particularly shown in Figs. 4 and 5, and the said pins 37 or their equivalents are provided at their upper ends with heads or with nuts, or any enlargement which will limit the upward movement of the outer ends of the said arms. This construction is for a purpose to be hereinafter stated.

Pulleys 38 are located on the cross bar 31 of the head of the rake, one near each end of said cross bar, as is shown in Fig. 2, and cables 39 and 40 are employed to elevate the rake A. These cables are secured at one of their ends to the cross bar 31 adjacent to the pulleys 38, and the said cables are then passed upward and over the pulleys 28 and are then carried downward over pulleys 38, then up over pulleys 29, then downward over pulleys 41 and 42 located at each side of the center of the rear beam 12, as is shown in Figs. 2 and 3. These cables 39 and 40 after passing over the pulleys 41 and 42 are brought together and are connected with a single cable 43 to which any suitable draft device may be applied, so that when the team attached to said cable is driven rearward the rake is hoisted and when the team is backed the rake is permitted to drop and assume its normal or gathering position. Springs 44 are secured to the arms 30, slightly to the rear of the connection of said arms with the said rake A, and when the rake is drawn upward to dumping position, shown in dotted lines in Fig. 1, these springs engage with the upper cross bar 25 and are compressed so that the moment that the tension on the cables 39 and 40 is relaxed, the springs 44 act to throw the rake A back or down into normal position.

I preferably secure rings 45 or their equivalents to the cables 39 and 40, which rings occupy a position in the normal position of the rake head quite close to the upper cross bar 25. The object of employing these rings or obstructions on the cables 39 and 40 is that when the said cables 39 and 40 are drawn upon to the extent that the rake is brought to practically an upper horizontal position, the rings or obstructions 45 will be brought in engagement with the cross bar 31 of the rake and the draft will then be direct and will not necessitate the team traveling very far to bring the rake to its full dumping position.

In the operation of the rake it is frequently necessary or desirable to cause the points of the teeth 33 to lie very close to the ground so as to pick up the maximum amount of hay. This can be accomplished by slightly raising the rear or head portion of the rake whereupon the teeth will by reason of their weight drop at the same time downwardly and forwardly owing to the loose connection between the arms 30 and the rake. This operation is accomplished through the medium of a lever 47 that is pivoted to the rear face of the rear beam or sill 12, preferably adjacent to the right hand side of the machine. This lever is connected with a long link 49 and a short link 49$^a$. The long link 49 extends to the left hand side of the machine and is connected with the lower end of the said lever 47, and is likewise connected with one member of an elbow lever 50 that is pivotally mounted upon the lower face of the rear sill 12 at the left hand end thereof, as is particularly shown in dotted lines in Fig. 2, and the other member of the said elbow lever 50 is connected with a link 51 that extends along the left hand side of the main frame at its outer portion and at its forward end is connected with an elbow lift lever 52 mounted for operation in the outer face of the left hand sill 10 of the frame. This lift lever 52 when operated raises the left hand arm 30 to a limited extent, and when the said lift lever is released the arm 30 drops to its normal position. When the arm 30 is raised it elevates the head section of the rake and permits the pointed ends of the teeth to drop close to the ground.

The right hand arm 30 is raised in a corresponding manner and is also simultaneously elevated through the connection of the shorter link 49$^a$ with the said lever 47, and this short link 49$^a$ is connected with an elbow lever 50$^a$ that is mounted upon the upper face of the rear beam 12 at the right hand side of the machine, and the said elbow lever 50$^a$ is connected by a link 51$^a$ extending forwardly alongside of the right hand frame beam 10 to an engagement with a lift lever 52ª corresponding to the lift lever 52 heretofore referred to. Therefore, when the lever 47 is raised or lowered, the arms 30 are correspondingly moved through the medium of the lift levers 52 and 52ª and their connection with the operating lever 47.

The lift levers 52 and 52ª are of angular construction comprising each an upwardly extending shank or body member and a shoe or lower member that extends beneath and in engagement with the under edge of an arm 30. The operating lever 47 just referred to is provided with a rack 48 and a thumb latch for engagement with the said rack so that the operating lever may be readily held in adjusted position. Preferably just to the front of the operating lever 47, or the lever for raising the head portion of the rake, a second operating lever 53 is pivoted to the inner or forward face of the rear sill 12. This latter lever 53 is also provided with a thumb latch and a rack 54 to be engaged thereby, as shown in Fig. 2. A long link 55 is connected with the said lever 53 extending substantially parallel with the link 49 of the lever 47, and in the same direction, namely, to the left hand end portion of the rear sill or beam 12. This long link 55 is pivotally connected with the elbow lever 56 that is also mounted upon the lower left hand portion of the main frame at its rear end; the opposite end of the elbow lever 56 is connected with the chain 57 and the said chain in its turn is connected with a link 58 that extends forward along the outer face of the left hand arm 30 being suitably guided in its passage and the forward end of the link 58 is pivoted to the member of the second elbow lever 59 that is mounted upon the forward portion of the left hand arm 30 to the rear of the rake head and from the opposite end of the elbow lever 59 an upwardly extending link 60 is carried and this link at its upper end is pivotally connected with the rigid arm 61 that extends forward over the cross bar 31 of the rake head and downward to an engagement with the under face of the cross bar 34 of the teeth of the rake, as particularly shown in Figs. 4 and 5.

The short link 55ª attached to the right hand portion of the lever 53 extends to the right side of the main frame at the point above the rear sill 12 and is adjusted to one end of the elbow lever 56ª that is pivoted upon the upper right hand rear corner portion of the main frame, as is shown in Fig. 2, and the said elbow lever 56ª is connected by a chain 57ª corresponding to the left hand chain 57 with a link 58ª that extends forwardly at the right hand portion of the right hand arm 30 and is connected with a member of the elbow lever 59ª pivoted on the right hand portion of the arm 30 correspondingly to its duplicate lever 59 at the left hand side of the said main frame, and the right hand lever 59ª is provided with an upwardly extending link 60ª that is connected in its turn with an arm 61ª that is correspondingly secured to the rake head and to the arm 61 above mentioned, and the arm 61 at the left hand side of the machine is passed through a suitable guide 62 secured to the cross bar 31 of the rake, and the corresponding or right hand arm 61ª is passed through a like guide 62ª, thus by moving the lever 53 in one direction the teeth of the rake are lifted from the ground, as is shown in Fig. 4, and the rake head is given a corresponding rearward inclination, and by operating the lever in the opposite direction the rake teeth are permitted to drop to their normal position relatively to the ground to be further depressed if necessary by the operation of the lever 47 heretofore described.

In the operation of the machine it is necessary that it should be prevented from moving rearward during the dumping operation, and to that end I employ anchoring arms 63 pivoted at their forward ends to the inner faces of the side sills or beams 10, being free to drop at their rear ends where said arms are provided with metal shoes 64 adapted to enter the ground. It is obvious that when the shoes are in engagement with the ground and the rake is drawn upward to its dumping position, that the weight of the rake will tend to hold the said shoes firmly in the ground and will prevent the machine from moving in a rearward direction. The said anchoring arms 63 can be raised at any time by operating cords or cables 65 that are attached to the rear end portions of the said anchoring arms and are carried up over guide pulleys 66 preferably located at the upper cross bar 25 and the free ends of the said cables are held in position by a cleat 67 or the equivalent thereof secured to one of the rear uprights 24, as is shown in Fig. 3.

A hook 46 or its equivalent is secured to the central portion of the forward cross bar 11 of the frame, extending within the said frame and a corresponding hook or its equivalent 46ª is attached to the central portion of the rear beam or sill 12, and when the rake is to be drawn forward the team occupy a position within the frame, the draft device being then connected with the rear hook 46ª and when the loader is to be drawn rearward the team occupy the same position, but the draft device is connected with the forward hook 46.

The hay when dumped out of the machine may be delivered to a wagon or other vehicle, or may be dumped upon the ground so as to form a stack.

Having thus described my invention, I claim as new and desire to secure by Letters Patent,—

1. In a hay loader, the combination of a wheel supported frame, arms pivoted to the side portions of the frame, a rake pivoted to the said arms at a point in rear of their forward ends, and means for providing limited vertical play between the rake and the forward ends of the said arms.

2. In a hay loader, the combination with a wheel supported frame, arms pivoted to the side portions of the frame and extending beyond its forward end, of a rake comprising a head section and a tooth section, the rake being pivoted to the arms in rear of their forward ends, a conection between the forward ends of said arms and the tooth section of the rake whereby the rake has limited vertical movement relatively to the said arms, and means for elevating the said rake, and a recoil device to assist the rake in assuming a receiving position from a dumping position.

3. In a hay loader, the combination with a wheel supported frame, inclined braces carried by the frame leading upward to the rear and arms pivotally connected at the outer side portions of the frame extending beyond its forward end, of a rake comprising a head section and a tooth section, the said rake being pivotally connected with the said arms in rear of their forward ends, means whereby the tooth section of the rake has limited vertical movement relatively to the forward ends of the said arms, means for raising the said rake, and a recoil device that acts upon the rake upon reaching its upper or dumping position.

4. In a hay loader, the combination with a wheel supported frame, arms pivoted to the side portions of the frame, extending beyond its forward end and anchoring devices pivoted to the frame, of a rake comprising a head section and a tooth section, a pivotal connection between the rake and the arms in rear of their forward ends, devices whereby the tooth section of the rake has limited vertical movement relatively to the forward ends of the said arms, a lever pivoted upon the said frame, a lifting device for the said arms and connections between the lifting device and the said lever.

5. In a hay loader, the combination of a wheel supported frame, arms pivotally attached to the side portions of the frame and projecting beyond the forward end of the same, a rake pivoted to the arms, a connection between the rake and the forward ends of the said arms, whereby the rake has limited vertical movement relative to said arms, means for raising the arms and rake, a pivoted lever, and means engaging the rake and operated by the lever for raising the rake into an approximately horizontal position.

6. A hay loader, comprising a wheel supported frame, the rear wheels being caster wheels, a lever, a connection between the said lever and the caster wheels whereby to turn the caster wheels, inclined braces supported by the frame, arms pivoted to the outer side portions of the frame and extending beyond the forward portion thereof, a rake having a tooth section and head section, a pivotal connection between the rake and the said arms at a point in rear of the forward ends of the arms, a connection between the rake and the forward ends of the arms whereby the rake has limited vertical play on the arms, means for raising the rake, a recoil device assisting in returning the rake from its dumping to its receiving position, a lever having lifting connection with the said arms, and a second lever having lifting connection relatively to the teeth of the rake.

7. In a hay loader a frame, bars pivoted to the sides of the frame and projecting beyond the forward end of the same, a rake carried by the projecting ends of the said bars and having vertical play thereon, arms engaging the rake, rocking members with which the arms are connected, and means for operating the said rocking members.

8. In a hay loader, a frame, bars pivoted to the sides of the frame and projecting beyond the forward end of the same, a rake having a cross bar connecting its teeth, the rake being pivoted to the said arms in rear of their forward ends, a loose connection between the forward ends of the bars and the cross bar of the rake, rocking members, arms connected with the rocking members and extending beneath the cross bar of the rake, and means for operating said rocking members.

9. In a hay loader, a frame, bars pivoted to the sides of the frame and projecting beyond the forward end of the same, said bars having their forward ends recessed on the under sides, a rake having a cross bar connecting its teeth, the rake being pivoted to the arms in rear of their forward ends, pins projecting from the cross bar of the rake and working loosely in openings in said bars, and means for raising the head portion of the rake.

10. In a hay loader, a frame, bars pivoted to the sides of the frame and projecting beyond the forward ends of the same, a rake having a cross bar connecting its teeth, the rake being pivoted to the said bars, pins projecting from the cross bar of the rake and working loosely in openings in the forward ends of the bars, means for slightly raising the head of the rake, pivoted angular levers, links connected to one member of each of the levers, arms connected to the links and projecting beneath the cross bar of the rake, and means for operating the levers.

11. In a hay loader, a wheel supported frame, bars pivoted to the sides of the frame and projecting beyond the forward end of the same, a rake comprising a rear bar, teeth attached to the bar, upwardly extending slats also secured to the said bar and a cross bar connecting the teeth, said rake being pivoted to the bars in rear of their forward ends and having its bar connecting the teeth loosely connected with the forward ends of the said bars, and means for raising and lowering the rake.

In testimony whereof I have signed my name to this specification in the presence of two subscribing witnesses.

ALBERT HENRY BOSWORTH.

Witnesses:
ERNST FLORIN,
M. D. PRATT.